Feb. 9, 1954           C. H. KAMAN           2,668,595

ROTOR CONTROL MECHANISM FOR AIRCRAFT OF ROTARY WING TYPE

Filed Feb. 28, 1947                          4 Sheets-Sheet 1

INVENTOR
CHARLES H. KAMAN
BY S. Jay Teller
ATTORNEY

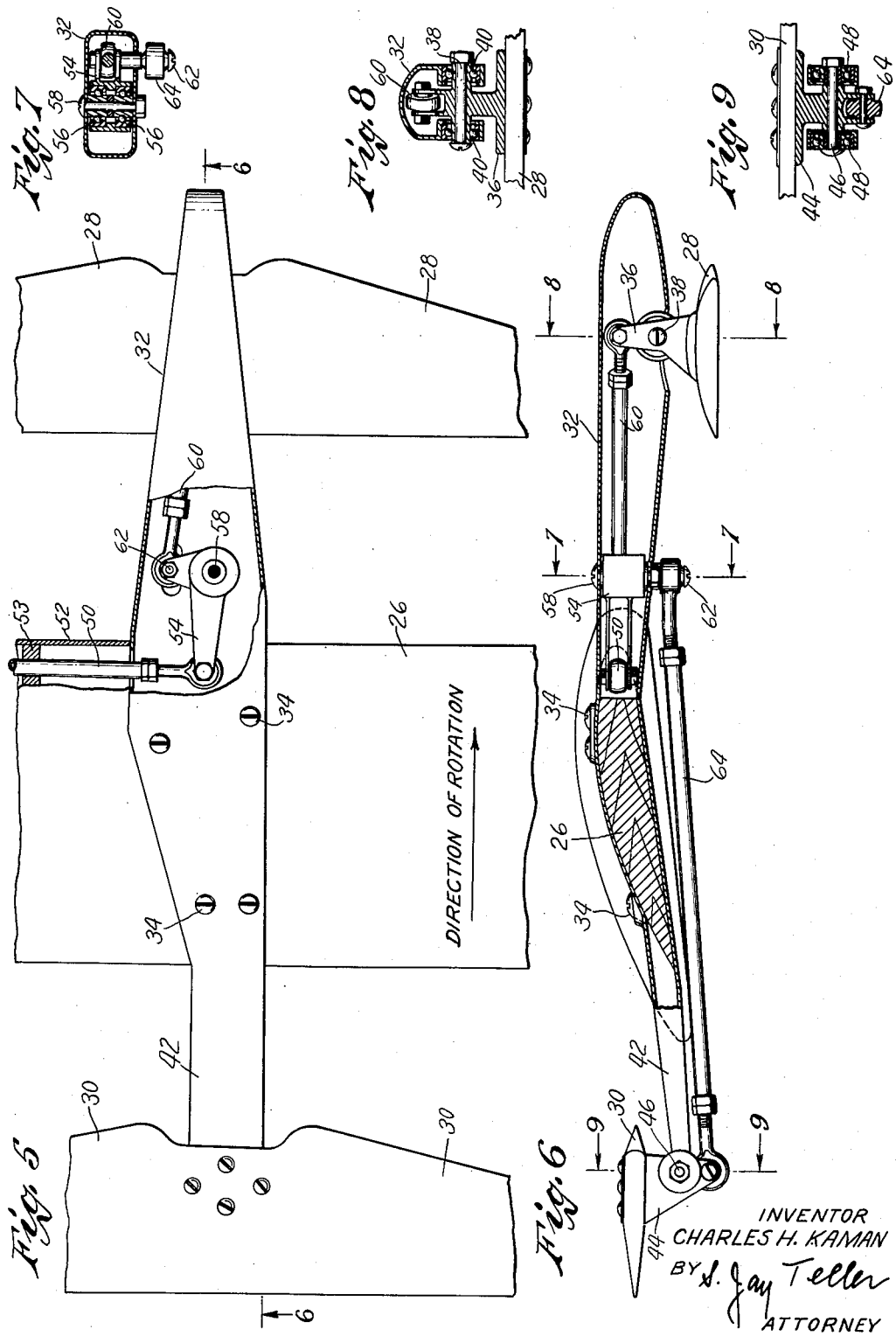

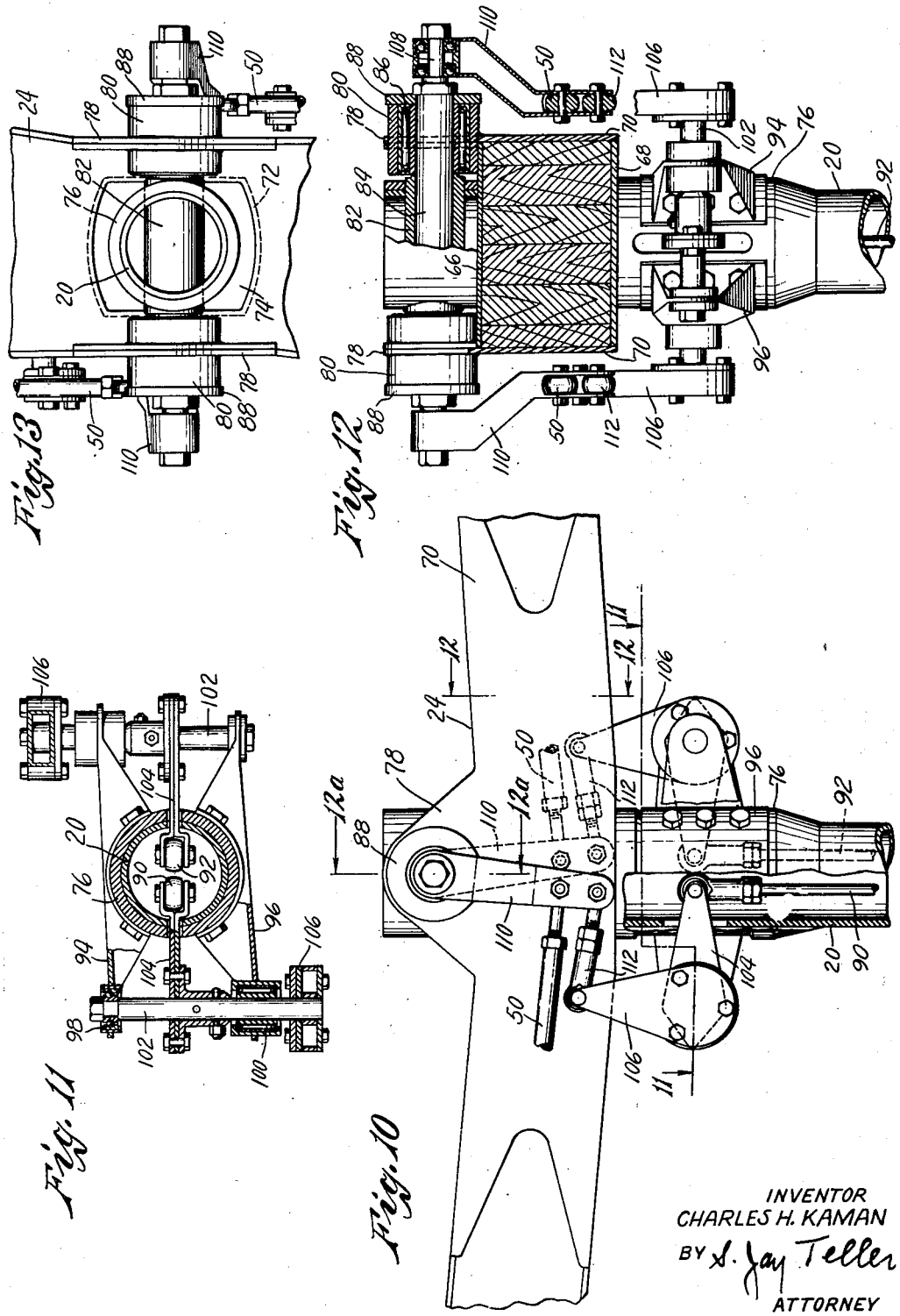

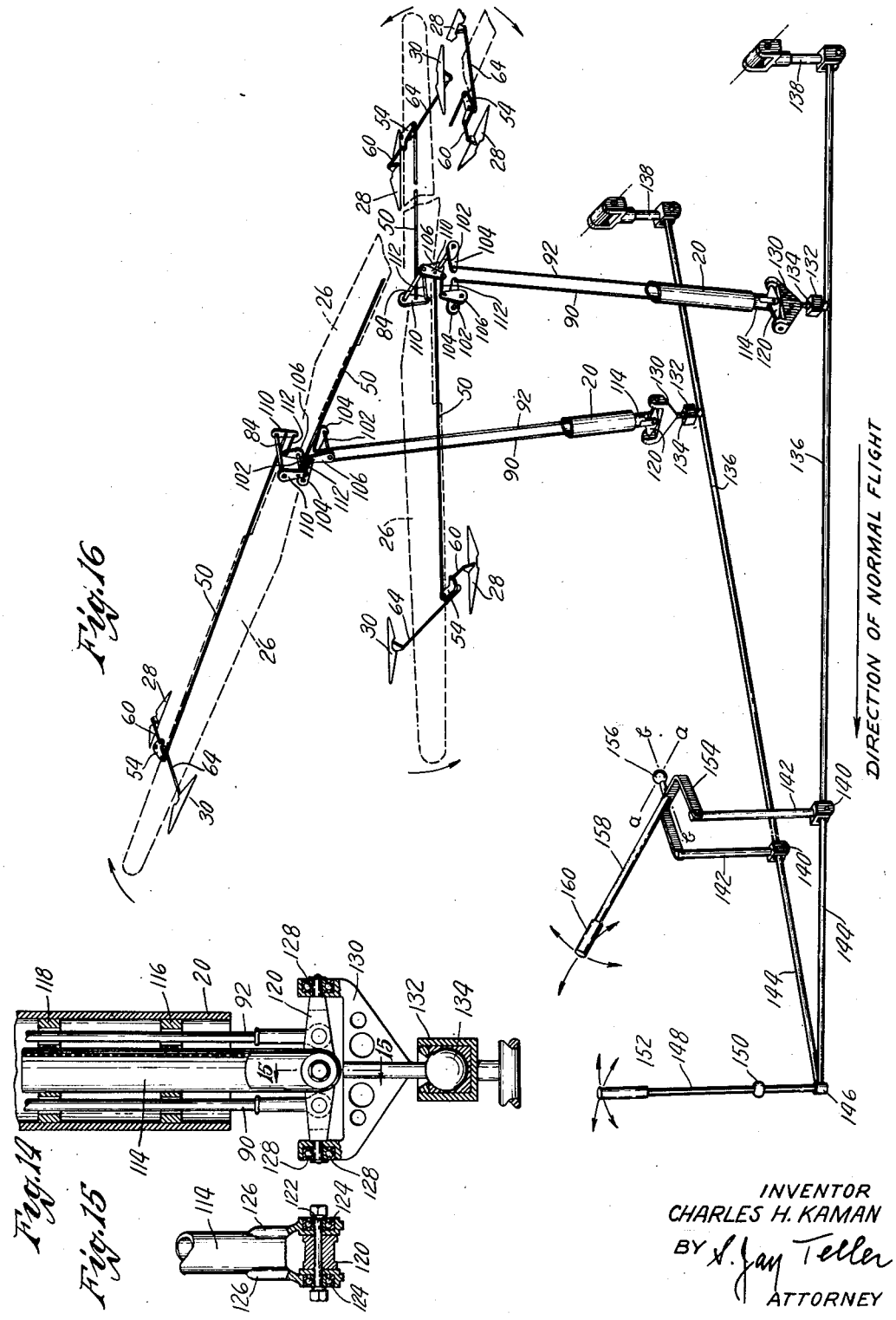

Patented Feb. 9, 1954

2,668,595

UNITED STATES PATENT OFFICE 2,668,595

ROTOR CONTROL MECHANISM FOR AIRCRAFT OF ROTARY WING TYPE

Charles H. Kaman, West Hartford, Conn., assignor to The Kaman Aircraft Corporation, Windsor Locks, Conn., a corporation of Connecticut Application February 28, 1947, Serial No. 731,656

14 Claims. (Cl. 170—135.24)

The invention is primarily useful in aircraft of the rotary wing type, such as autogyros, helicopters, gyrodynes and the like. The invention in many of its aspects relates primarily to the rotor and to control mechanism therefor, and as to these aspects the invention may be generally applicable, not only to rotors for rotary wing aircraft, but also to other aerodynamic rotors such as aircraft propellers and windmills. By way of illustration the invention will be shown and described as incorporated in a helicopter, as to which it has particular advantages.

The present invention involves principles similar to those disclosed in my Patent No. 2,455,866, dated December 7, 1948, the present application being a continuation-in-part of application Serial No. 691,431, filed August 19, 1946, upon which the said patent was issued. As to one of its aspects, the present invention, like the invention set forth in the prior application, involves novel means for modifying the effective pitches of the rotor blades. It has been the more usual prior practice to so connect the blades with the hub that they can be adjusted bodily about axes perpendicular to the axis of rotation and extending longitudinally of the blades. It has also been proposed alternatively to provide the blades with flaps which can be adjusted so that the aerodynamic actions of the flaps are added to or subtracted from those of the blades. One of the important objects of the present invention is to provide a rotor having resilient or torsionally actuated blades, the inner ends of which are relatively fixedly connected with the hub so that bodily rotation at the root is prevented about axes extending longitudinally of the blades and to provide two flaps on the respective blades which are so designed, positioned and controlled that aerodynamic action thereon during rotation serves to twist the blades in opposition to their own resiliency so as to change the effective pitches thereof. This greatly simplifies the connection of the blades with the hub and eliminates the necessity for retention bearings and eliminates all associated problems of fatigue, life and control friction, it makes possible the use of a much lighter and more easily handled control mechanism, and it has numerous other advantages which will be pointed out in detail. In a rotary wing aircraft, such as a helicopter, the adjustment of the flaps serves to control vertical and horizontal motion.

The present invention, as concerns the blades and the parts directly associated therewith, is distinguished essentially from the invention of the prior application by the provision of two flaps on each blade, instead of only a single flap, the two flaps preferably being respectively adjacent the leading and trailing edges of the blade and being interconnected for adjustment in unison. The leading flap ordinarily has an initial positive pitch and the trailing flap ordinarily has an initial negative pitch, and the two flaps act cooperatively during rotation to increase the effective pitch of the blade. By adjusting the flaps to increase or decrease the positive pitch of the leading flap and to simultaneously increase or decrease the negative pitch of the trailing flap, the extent of twisting of the blade can be changed thus changing the effective pitch thereof.

The provision of two flaps on each blade positioned and connected as stated, instead of a single flap, serves to increase the torsional frequency of the blade and to reduce or eliminate the hazard of blade resonance, as will be hereinafter more fully explained. Furthermore, the provision of two flaps makes it possible to provide an increased total moment tending to twist the blade, or if increased twisting movement is not required the provision of two flaps makes it possible for each of them to be smaller than the single flap of the prior application.

A further object of the invention is to provide a rotary wing aircraft wherein the rotor is pivotally movable relatively to the main vertical shaft about a horizontal axis and wherein there are two flaps on the respective blades thereof which are adjusted during rotation to eliminate, or at least greatly reduce, the tendency of the rotor to oscillate about the said horizontal axis.

A still further object of the invention is to provide novel and advantageous mechanism for moving and controlling the pairs of flaps on the blades of a rotor.

Another object of the invention is to provide, in a helicopter having a rotor wherein the lift of the blades is adjustable, an improved mechanism for adjusting the lift of the blades, which mechanism includes an azimuth member and associated parts having advantageous features of construction and operation. As to this phase of the invention, it is not essential that the adjustment of the lift of the blades be effected by the twisting of the blades.

Still another object of the invention is to provide, in a helicopter having two similar rotors wherein the lift of the blades is adjustable, a pilot controlled mechanism for adjusting the lift of the blades, which mechanism includes two similar azimuth members and means for adjusting the azimuth members uniformly or otherwise as may be necessary to control the flight of the helicopter. Also as to this phase of the invention, it is not essential that the adjustment of the lift of the blades be effected by the twisting of the blades.

Other objects of the invention will be apparent from the drawings and from the following specification and claims.

In the drawings I have shown in detail a preferred embodiment of the invention and also a variation thereof, but it will be understood that various changes may be made from the constructions shown, and that the drawings are not to be construed as defining or limiting the scope of the invention, the claims forming a part of this specification being relied upon for that purpose.

Of the drawings:

Fig. 5 is an enlarged plan view showing a portion of one of the blades and the adjustable flaps carried thereby.

Fig. 6 is a vertical sectional view taken along the line 6—6 of Fig. 5.

Fig. 7 is a vertical sectional view taken along the line 7—7 of Fig. 6.

Fig. 8 is a vertical sectional view taken along the line 8—8 of Fig. 6.

Fig. 9 is a vertical sectional view taken along the line 9—9 of Fig. 6.

Fig. 10 is a combined side and vertical sectional view of one of the main hubs, together with portions of the rotary wing carried thereby.

Fig. 11 is a horizontal sectional view taken along the line 11—11 of Fig. 10.

Fig. 12 is a right end view of the parts shown in Fig. 10, this view being partly in section along the line 12—12 of Fig. 10 and partly in section along the line 12ª—12ª of Fig. 10.

Fig. 13 is a fragmentary plan view of the parts shown in Fig. 12.

Fig. 14 is a fragmentary view, partly in section, showing the lower portion of the drive shaft and the immediately associated parts.

Fig. 15 is a fragmentary vertical sectional view taken along the line 15—15 of Fig. 14.

Fig. 16 is a schematic view showing the manually operable control mechanism.

Figure 1:
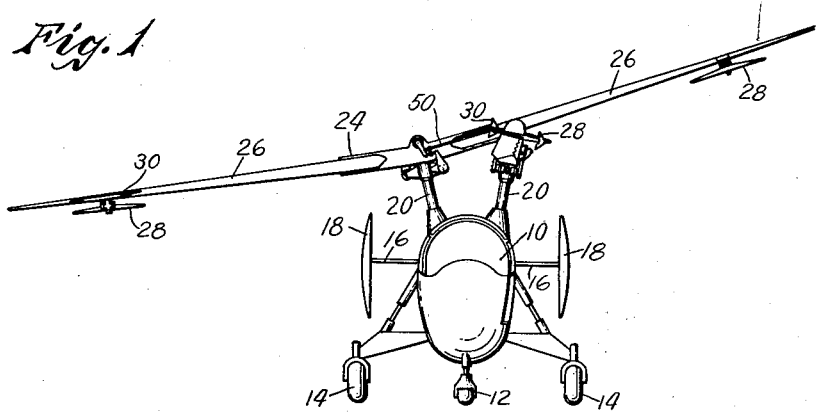
Fig. 1 is a front view of an aircraft having my invention incorporated therein.
Figure 2:
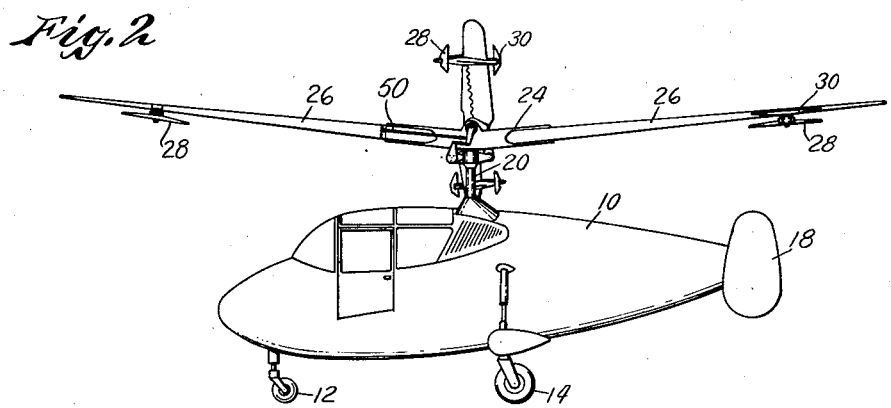
Fig. 2 is a left side view.
Figure 3:
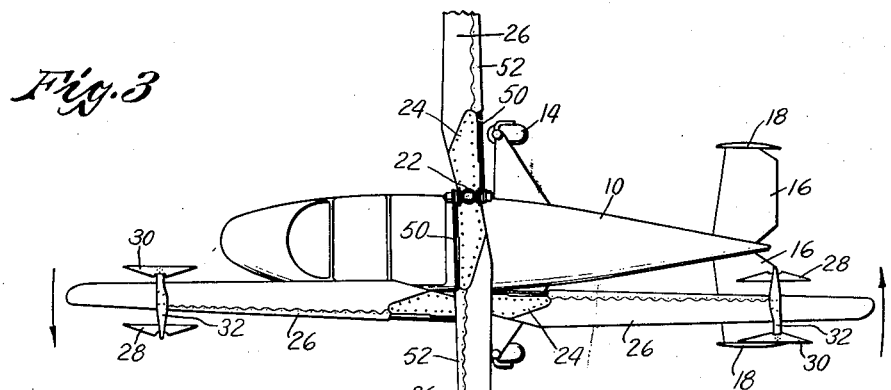
Fig. 3 is a plan view.

In Figs. 1 to 3 of the drawings I have shown an aircraft of the helicopter type having rotary wings and control mechanisms therefor which embody the invention. The structure of the helicopter may be widely varied and the particular structure shown is intended to be merely illustrative.

The helicopter as illustrated in the drawings comprises a fuselage 10 provided with landing wheels 12 and 14, 14. The fuselage may carry stabilizers 16, 16 having vertical fins 18, 18. Mounted within the fuselage is a suitable power plant which is not shown, as this does not of itself constitute any part of the present invention.

Rotatably mounted in suitable bearings in the fuselage is at least one substantially vertical supporting and driving shaft 20. Secured to the shaft 20 at the upper end thereof is a rotor including a hub 22 having a blade support 24 carrying a plurality of aerofoil blades 26, 26 which are uniformly spaced circumferentially. As shown, there are two blades 26, 26 connected with the support 24 and there are important advantages in the provision of only two blades as will presently appear. However, the invention as to some of its aspects is not limited to the use of only two blades and a larger number may be used. As hereinafter explained in detail, the hub 22 is connected with the shaft for movement about a horizontal axis intersecting the shaft axis.

Preferably there are two supporting and driving shafts 20 as shown in Fig. 1, each of them being provided with a rotor including a hub 22 having a blade support 24 connected with blades 26, 26. When there are two shafts and two rotors the shafts are preferably inclined and diverge upwardly as shown. The two shafts are connected by gearing or otherwise to the power plant so that they can be rotated thereby in synchronism but in opposite directions. The blades 26, 26 and the blade support 24 of one rotor are similar to the blades 26, 26 and the blade support 24 of the other rotor except that these parts are oppositely shaped to conform to the respective directions of rotation. As clearly shown in Fig. 3, the hubs and the blades are so connected with the respective shafts 20, 20 that the blades on one rotor are longitudinal when those on the other rotor are transverse. This arrangement, together with the diverging inclinations of the shafts 20, 20 enables the blades of the two rotors to clear each other as they are rotated. The rotation of the rotors in opposite directions avoids any tendency for the reactive forces to turn the aircraft, as these reactive forces, being in opposite directions, normally neutralize each other. Nothwithstanding the inclinations of the shafts 20, 20 they are for convenience referred to as "substantially vertical" and certain parts carried by the shafts are for convenience referred to as "substantially horizontal."

By means of the common support 24 the blades 26, 26 of each rotor are relatively fixedly secured to the corresponding hub 22, that is, they are connected for bodily rotation with the hub but are rigidly held to prevent any relative rotative movements of the root portions thereof about axes extending longitudinally of the blades. The blades preferably have positive dihedral angles as shown. The main body of each blade 26 is shown as being formed of wood which may be laminated in accordance with usual practice, but the invention is not limited to a blade formed of wood nor to a blade of solid construction.

The outer end portions of the blades 26, 26 carry pairs of auxiliary aerofoil flaps 28, 30 and 28, 30 which have various functions as hereinafter described. The two flaps on each blade may be variously located with respect thereto, but they are substantially equally spaced from the shaft and each of them is transversely spaced, preferably to a substantial extent, from the longitudinal mean axis of the blade. The term "transversely" is used to indicate spacing in the plane of rotation, and unless otherwise stated it may include either forward spacing or rearward spacing. The flaps 28 and 30 on each blade are preferably located respectively adjacent the leading and trailing edges thereof, and they are in fact preferably spaced respectively forward and rearward from the leading edges. Preferably, the two flaps are also spaced axially with respect to the blade and they may advantageously be spaced axially in opposite directions. The term "axially" is used in connection with the positioning of the flaps to indicate spacing in the direction of the axis of rotation, and unless otherwise stated it may include either spacing in the direction of the aerodynamic action of the rotor or in the opposite direction. The direction of aerodynamic action is the axial direction in which the rotor tends to move. In the case of a rotor for a rotary wing aircraft the term "axially spaced" may include either upward spacing or downward spacing. As shown, the leading flap 28 is axially spaced downward and the trailing flap 30 is axially spaced upward, but there may be departure from this specific arrangement.

At least one of the flaps 28 and 30 of each pair is movable about an axis extending longitudinally of the corresponding blade, and preferably both flaps are so movable, whether relatively positioned as shown or relatively positioned otherwise. The flaps are preferably interconnected so that they are movable in unison, and they are preferably moved in opposite directions about their respective axes.

The details of the preferred construction for supporting and moving the two flaps 28 and 30 are shown in Figs. 5 to 9. These figures show the flaps on a blade of the rotor which is rotating counterclockwise; and it will be understood that the construction is reversed for the flaps on a blade of the rotor which is rotating clockwise. The flaps are preferably formed of laminated wood, but the invention is not limited to flaps formed of wood, nor to flaps of solid construction. For supporting the leading flap 28 in proper relationship to the blade, there is provided an arm 32 projecting forward from the blade and rigidly secured thereto. This arm is formed of sheet metal and is of box-like shape as shown in Fig. 7, the cross-sectional shape varying as will be apparent from an inspection of Figs. 5 and 6. The upper and lower walls of the arm are continued rearward along the top and bottom surfaces of the blade, being secured thereto by means of bolts 34, 34. For connecting the flap 28 to the arm 32 there is provided a lever 36 which extends upward from the flap through an opening in the bottom of the arm and which is pivotally connected between its ends with the arm for movement about a substantially horizontal axis extending longitudinally of the blade. As shown in Fig. 8, the lever 36 is mounted on a pivot pin 38 which is supported in ball bearings 40, 40 carried by the side walls of the arm 32.

For supporting the trailing flap 30 in proper relationship with the blade there is provided an arm 42 projecting rearward from the blade and rigidly secured thereto. This arm also is formed of sheet metal and is of box-like shape and preferably it is formed integrally with the beforementioned extensions of the arm 32 which are secured to the top and bottom surfaces of the blade. For connecting the flap 30 to the arm 42 there is provided a lever 44 which is pivotally connected between its ends with the arm for movement about a substantially horizontal axis extending longitudinally of the blade. As shown in Fig. 9, the lever 44 is mounted on a pivot pin 46 which is supported in ball bearings 48, 48 carried by the side walls of the arm 42.

As already stated, the flaps 28 and 30 are movable about their pivotal axes and are preferably so movable in unison and in opposite directions. This movement serves to change the pitches of the flaps with respect to the direction of rotative movement. For moving the flaps and for holding them in adjusted positions, a suitable mechanism is provided which includes a control member or link 50, preferably tubular, extending longitudinally of the blade 26 and preferably located adjacent the leading edge thereof. The leading edge of the blade is cut away to provide space for the control member or link 50 and this space is enclosed by a leading edge member 52 which conforms to the required shape of the blade. A plurality of guides for each member 50 may be provided within the leading edge member 52, one of these guides being shown at 53 in Fig. 5. The outer end of the link 50 is pivotally connected with one arm of a bell crank 54 which is positioned within the rear portion of the arm 32. As shown in Fig. 7, the bell crank 54 is mounted on ball bearings 56, 56 held in place by a vertical pin 58 passing through the top and bottom walls of the rear portion of the arm 32. Connected with the other arm of the bell crank 54 within the arm 32 is a link 60, preferably tubular, the forward end of the link being connected with the upper end of the lever 36 which supports the flap 28. Extending downward from the said other arm of the bell crank 54 through a slot in the bottom of the arm 32 is a stud 62 to which is connected a link 64, preferably tubular, the rear end of the link being connected with the lower end of the lever 44 which supports the flap 30.

It will be seen that when the control member or link 50 is moved in the outward direction the bell crank 54 is turned in the counterclockwise direction. When the bell crank is so turned, the link 60 adjusts the leading flap 28 in the counterclockwise direction to decrease the negative pitch thereof or to increase the positive pitch thereof, and the link 64 moves the flap 30 in the clockwise direction to decrease the positive pitch thereof or to increase the negative pitch thereof. Conversely, when the control member or link 50 is moved in the inward direction, the bell crank 54 is moved in the clockwise direction, thus moving the flap 28 in the clockwise direction to decrease the positive pitch thereof or to increase the negative pitch thereof and to move the flap 30 in the counterclockwise direction to decrease the negative pitch thereof or to increase the positive pitch thereof. The flaps can thus be moved by means of the control member or link 50 to any desired angular positions within predetermined limits.

The pitch relationship of the two flaps may be varied, but it may advantageously be such that when one of them is at zero pitch the other is also at zero pitch. If the flaps are then adjusted to give the leading flap a positive pitch, the trailing flap is given a negative pitch, or if the flaps are then adjusted to give the leading flap a negative pitch, the trailing flap is given a positive pitch.

It has already been stated that the support 24 of each rotor serves to hold the blades 26, 26 thereof so that they are relatively fixed with respect to the hub 22, being bodily rotatable in unison with the hub, but nevertheless rigidly held to prevent any relative rotative movements of the root ends thereof about longitudinal axes. While the blades are fixedly connected with the hub to the extent above stated, they are nevertheless capable of limited pivotal movements, in unison about a substantially horizontal axis which is perpendicular to the blades and also perpendicular to the axis of rotation. The details of the hub and of the connection thereof with the rotor are shown in Figs. 10 to 13, and reference will be had to these figures in the following description.

Each of the blade supports 24 preferably comprises substantially parallel top and bottom plates 66 and 68 which at their outer portions conform in transverse contour to the transverse contour of the blades. The inner portions of the plates 66 and 68 are connected, as for instance by welding, with vertical plates 70, 70, the said four plates at the central portions thereof providing a space which is rectangular in transverse section. Each support 24 is provided at the center with a flat-sided hollow member 72 which extends vertically between the top and bottom plates 66 and 68, the said plates being provided with openings conforming in shape to the shape of the said hollow member. Thus the said hollow member 72, together with the said openings in the top and bottom plates, provides a vertical well 74 extending entirely through the support 24. The corresponding supporting and driving shaft 20 extends entirely through the well 74 and projects somewhat above the top plate 66. The said shaft 20 is hollow and the upper portion thereof is provided with an outer sleeve or tube 76.

The side plates 70, 70 are provided with upward extending ears 78, 78, these being apertured to receive horizontal bearing housings 80, 80 which are welded in place. The shaft 20 and the sleeve 76 are transversely apertured near their upper ends to receive a horizontal bushing 82 which is welded or otherwise secured in place. A horizontal pivot pin 84 extends through the bushing 82 and also through the bearing housings 80, 80. Interposed between the pin 84 and each bearing housing 80 is an antifriction bearing 86. At the outer ends of the bearings 86 are end caps 88, 88 which hold the bearings in place. It will be seen that by means of the construction described, the support 24 and also the rotor blades 26, 26 are connected with the hub for rotation in unison therewith, but are nevertheless pivotally movable in unison with respect thereto about the axis of the bearing pin 84, which axis is substantially horizontal. The blades cannot bodily rotate relatively to the hub about axes extending longitudinally of the blades.

Positioned within the hollow shaft 20 are two vertically movable actuating members or links 90 and 92, preferably tubular, which are operably connected with the respective links 50, 50 for adjusting the pairs of flaps on the two blades of the rotor. Suitable mechanisms are provided for connecting the links 90 and 92 with the respective links 50, 50, and as these mechanisms are identical in construction a detailed description of one of them will suffice. Secured to the shaft 20 or to the sleeve 76 thereon are two brackets 94 and 96 which support antifriction bearings 98 and 100. Mounted in these bearings is a horizontal shaft 102. An arm 104 is secured to the shaft 102 between the bearings, this arm projecting inward through a slot in the shaft 20 and in the sleeve 76. Secured to the outer end of the shaft 102 is an arm 106 which extends upward. The said arms 104 and 106 and the said shaft 102 collectively constitute a bell crank. Means are provided for operatively connecting the upper end of the link 90 with the inner end of the arm 104 of the bell crank. Means is also provided for operatively connecting the inner end of the link 50 with the upper end of the arm 106 of the bell crank. The last said means comprises a lever 110 which is pivoted for movement about a horizontal axis in fixed relation to the root portion of the corresponding blade. As shown, the lever 110 is pivoted to an extension 108 of the pivot pin 104 and it extends downward therefrom. A link 112 connects the upper end of the bell crank arm 106 with the lower end of the lever 110. The link 50 is connected with the lever 110 between the ends thereof.

The outer portion of each link 50 is located within the leading edge member 52, as already stated. The inner portion of each link 50 is at the front of the leading edge of the blade as shown in Fig. 10. The blade is so shaped, as shown in Fig. 3, that the link emerges from the leading edge member 52 at a position near the end of the blade support 24.

It will be seen that when the link 90 is moved upward, the bell crank arms 104 and 106 are moved in the counterclockwise direction and the lever 110 is moved in the clockwise direction, thus moving the link 50 in the outward direction. As already stated, movement of the link 50 in the outward direction serves to move the leading flap 28 in the direction to increase the positive pitch thereof and to move the trailing flap 30 in the direction to increase the negative pitch thereof. Conversely, when the link 90 is moved downward, the link 50 is moved in the inward direction, thus serving to move the leading flap 28 in the direction to decrease the positive pitch thereof and to move the trailing flap 30 in the direction to decrease the negative pitch thereof.

Figs. 14 and 15 show the lower end portion of the shaft 20 and the parts carried thereby. A tubular member or post 114 is provided at the center of the shaft 20, this post being guided for relative vertical movement by means of discs 116 and 118 secured to the inner wall of the shaft. The post 114 is keyed to one or both of the discs 116 and 118 so as to be rotatable in unison with the shaft. A lever or bar 120 is horizontally pivoted midway between its ends to the said post 114 at the lower end thereof. As shown, the bar 120 is supported on a pin 122 which is mounted in bearings 124, 124 secured to brackets 126, 126 secured to the post. The links 90 and 92 extend through eccentric apertures in the discs 116 and 118 and the lower ends thereof are pivotally connected with the bar 120 at opposite sides of the pivotal axis thereof.

The ends of the bar 120 are pivotally connected by means of bearings 128, 128 with a wobble or azimuth member 130 which by reason of its connection with the said bar 120 is rotatable in synchronism with the main shaft 20. The lower portion of the azimuth member 130 is pivotally connected with an azimuth control element 132 which is movable horizontally in any direction or vertically by suitable mechanism such as that shown schematically in Fig. 16. The connection between the azimuth member 130 and the control element 132 is such that the axis of rotation of the azimuth member may be inclined in any direction in accordance with the horizontal movements of the control element. As shown, the control element includes a ball socket which receives and fits a ball 134 connected with or forming a part of the azimuth member 130.

When the control element 132 is moved vertically upward, the links 90 and 92 are moved upward and the flaps 28 and 30 are moved in the directions to decrease the negative pitch or increase the positive pitch of the leading flap and to decrease the positive pitch or increase the negative pitch of the trailing flap. When the control element 132 is moved vertically downward the links 90 and 92 are moved downward and the flaps are adjusted in the directions opposite to those last stated.

When the control element 132 is moved horizontally in any direction, the axis of rotation of the azimuth member is moved so that it is at an angle to the axis of rotation of the shaft 20 and of the parts carried thereby. The axis of rotation of the azimuth member extends through the center of the ball 134 and through the intersection of the axis of the bearings 124, 124 and the axis of the bearings 128, 128. Fig. 14 may be assumed to be a view looking toward the right side of the aircraft, and it may be further assumed, merely for the purpose of the present explanation, that no rotation is taking place. If the control element is moved toward the front (or toward the left as viewed in Fig. 14) or is moved toward the rear (or toward the right as viewed in Fig. 14) the lever 120 and the azimuth member are adjusted about the axis of the bearings 124, 124; and if the control element is toward the right of the aircraft or toward the left of the aircraft, the azimuth member is adjusted about the axis of the bearings 128, 128. If the control element is moved in any diagonal direction adjustments take place about both axes.

When the several parts are rotated, with the azimuth member in any position except with its axis vertical, cyclical adjustments of the member take place about both horizontal axes and the bar 120 is given a cyclical oscillatory movement, the extent of such movement being dependent on the distance of the ball socket of the control element from its central position. As the bar 120 is oscillated, the links 90 and 92 are cyclically reciprocated vertically in opposite directions, and the flaps 28 and 30 on both blades of the rotor are oscillated through a complete cycle during each rotation.

It has been stated that the blades 26, 26 may be formed of wood in accordance with usual practice. Each blade, whether formed of wood or otherwise, has a torsional resiliency in at least a portion thereof which permits the outer portion to be twisted within the limit of elasticity with respect to the inner end thereof about a longitudinal mean axis so as to substantially change the effective pitch. In accordance with the invention the aerodynamic actions of the flaps 28, 30 and 28, 30 during rotation are utilized to torsionally twist the blades so as to change the effective pitches thereof to definitely determined extents. The torsional resiliency of the blades is such that it tends to restore the blades to their normal shapes or positions after twisting. As already stated, the flaps are spaced transversely from the longitudinal mean axes of the blades and the flap 28 is preferably adjacent and spaced forward from the leading edge of the blade, and the flap 30 is preferably adjacent and spaced rearward from the trailing edge of the blade. This arrangement of the flaps relatively to the blades gives them twisting moments that enables them to act as aforesaid to twist the blades during rotation and to thereby change the effective pitches thereof. Twisting is effected progressively from the nonrotatable root portions of the blades toward the said flaps. When the blades are resilient throughout the entire distance between the said root portions and the said flaps, twisting occurs progressively throughout the said entire distance from the root portions to the flaps.

Ordinarily the leading flap is initially given a positive pitch providing a twisting moment which tends to lift the leading edge of the blade and therefore to twist the blade in the pitch increasing direction. The trailing flap is initially given a negative pitch providing a twisting moment which tends to depress the trailing edge of the blade and therefore to also twist the blade in the pitch increasing direction. Thus the aerodynamic action of the two flaps during rotative movement serves to apply a combined twisting moment to the blade which serves to increase the effective pitch thereof, and the extent of such twisting may be varied by changing the initial positive and negative pitches of the flaps. When the flaps are adjusted to increase their last said pitches, the blade is additionally twisted to further increase its effective pitch, and when the flaps are adjusted to decrease their last said pitches the resiliency of the blade restores it to a decreased effective pitch.

Although the leading flap ordinarily has an initial positive pitch and the trailing flap ordinarily has an initial negative pitch, this condition may be reversed. When so reversed, the aerodynamic action of the two flaps during rotative movement serves to apply a combined twisting moment to the blade which serves to decrease the effective pitch thereof, and the extent of such twisting may be varied by changing the negative and positive pitches of the flaps. When the flaps are adjusted to increase their last said pitches, the blade is additionally twisted to further decrease its effective pitch, and when the flaps are adjusted to decrease their last said pitches the resiliency of the blade restores it to an increased effective pitch.

The effective working area of the rotor blade is principally the outer third thereof and the flaps are therefore preferably positioned along the blade so as to cause a maximum of change in the effective pitch thereof. Obviously, the twisting takes place between the root of the blade and the flaps and the portion of the blade beyond the flaps is rotated without twisting. It has been found that the flaps should be placed at a position within the range of about 60% to about 90% of the distance from the axis of rotation to the tip of the blade. A location at approximately 75% of the distance from the axis to the tip is ordinarily preferable. With the flaps positioned as described, they are spaced sufficiently outward from the axis of rotation to give a substantial amount of twist to the blade between the root and the flaps, and they are spaced sufficiently inward from the tip to rotate and change the pitch of the major portion of the effective working area of the blade. The practical result is that by utilizing the flaps to twist the blades in the manner described, the changes in the effective pitches are substantially equivalent to the bodily rotation of the entire blade which has been the prior conventional practice.

It will be understood that during twisting of the blade in the pitch increasing direction the initial positive pitch of the leading flap is increased by reason of the twisting action and the initial negative pitch of the trailing flap is decreased by reason of the twisting action, such increase and decrease being effected without any relative movement of the flap control mechanism. Conversely, during twisting of the blade in the pitch decreasing direction the initial negative and positive pitches of the leading and trailing flaps are respectively increased and decreased by reason of the twisting action. These changes in flap pitches resulting from twisting of the blade must be taken into account in considering the extent of blade twisting under any given conditions.

In order that the action of the flaps may be more clearly understood, it may be assumed that each blade has a definite initial normal positive pitch and it may be further assumed that the blade and the flaps thereon are in torsional equilibrium during rotation when both flaps are at zero pitch, the twisting moment of the two flaps therefore being zero. If the flaps are moved to give the leading flap an initial positive pitch and to give the trailing flap an initial negative pitch, the two flaps have a total twisting moment acting on the blade in the pitch increasing direction equivalent to the sum of the twisting moment resulting from the positive pitch of the leading flap and the twisting moment resulting from the negative pitch of the trailing flap. As the blade and flaps are rotated, the blade is twisted by the flaps until the total moment exerted thereby is balanced by the resistance to twisting offered by the blade, whereupon equilibrium is established.

The blade and flaps may be designed for various ratios of equilibrium. It may be assumed by way of example that the blade has an initial normal pitch of 10° and that the parts are so designed that, for a predetermined speed of rotation, equilibrium will be established when the resistance to twisting offered by the blade is twice the total pitch of the leading flap tending to cause twisting. If the leading flap is given an initial positive pitch of 1° and if the trailing flap is given an initial negative pitch of 1°, the total pitch of the flaps is 2° and there is a twisting moment which twists the blade to a certain extent to increase the pitch thereof. However, this increase in the pitch of the blade correspondingly increases the positive pitch of the leading flap and correspondingly decreases the negative pitch of the trailing flap, and equilibrium will be attained when the positive pitch of the leading flap has been increased to 2° and when the negative pitch of the trailing flap has been decreased to zero, and when the blade has been twisted to increase the pitch thereof by 1° and to give it a total effective pitch of 11°.

The flaps may be adjusted to decrease as well as increase the normal pitch of the blade. For instance, if the leading flap is given an initial negative pitch of 1° and if the trailing flap is given an initial positive pitch of 1°, the total pitch of the flaps is 2° and there is a twisting moment which twists the blade to a certain extent to decrease the pitch thereof. However, this decrease in the pitch of the blade correspondingly increases the negative pitch of the leading flap and correspondingly decreases the positive pitch of the trailing flap, and equilibrium will be attained when the negative pitch of the leading flap has been increased to 2° and when the positive pitch of the trailing flap has been decreased to zero and when the blade has been twisted to decrease the pitch thereof by 1° and to give it a total effective pitch of 9°.

The ratio of equilibrium upon which the foregoing examples are based is merely illustrative and there may be wide variations therefrom. For instance, stating a particular case, the relationship of the bell crank 54 and the flap supporting levers 36 and 44 may be so altered that when the leading flap is given an initial positive pitch of 1° the trailing flap is given an initial negative pitch of 1.33°. Thus equilibrium would be established when the blade has been twisted to increase its pitch by 1.0°, the leading flap then having a pitch of 2° and the trailing flap then having a negative pitch of .33°. The advantage of such an altered relationship would be to enhance the working range of operation of the leading flap by introducing a greater working effort in the rear flap.

In the examples that have been given, the trailing flap has zero pitch during normal operation after the blade has been twisted. However, the invention is not necessarily so limited, and the trailing flap may have a negative or positive pitch during normal operation and after the blade has been twisted. Furthermore, in the examples that have been given, the stated results are attained at a predetermined speed of rotation. For a greater or less speed of rotation, the twisting effects of the flaps are greater or less and the changes in flap pitches due to blade twisting are greater or less.

In practice the control mechanism for the flaps may be so designed and controlled that the leading flap initially has a negative pitch and that the trailing flap initially has a positive pitch, the flaps thus initially serving during rotation of the rotor to initially decrease rather than increase the effective pitch of the blade. As the flaps are adjusted toward their positions of zero pitch, the blade is permitted to assume its normal pitch without twist. Then the flaps are adjusted to give the leading flap a positive pitch and to give the trailing flap a negative pitch, the flaps then serving during continued rotation to increase the effective pitch of the blade.

In actual design various factors other than those which have been set forth must be considered, such as the forces due to the aerodynamic pitching moment properties of the blades, the centrifugal moments due to the masses of the flaps and their supports which tend to effect twisting of the blades, the weights of the flaps and their supports which also tend to effect twisting of the blades, and the centrifugal twisting forces acting on the blade alone. When the two flaps are of equal areas and are angularly adjusted to the same extents, as is ordinarily preferred, the flaps have no net lifting effect, as the lifting effect of the leading flap is balanced by the depressing effect of the trailing flap. Under these conditions the primary and in fact the principal function of the flaps is merely to twist the blade to change the effective pitch thereof.

The construction shown and described differs from that shown and described in the aforesaid copending application primarily in the provision of a trailing flap in addition to the leading flap. This has important advantages, one of the most important of which is that torsional frequency is greatly increased thus avoiding torsional resonance.

Considering the several factors which define the torsional frequency of the blade about its longitudinal mean axis during rotation, it is an established fact that the natural torsional frequency is equal to the square root of the torsional spring constant divided by the polar moment of inertia. This may be expressed by the formula:

$$\omega_n = \sqrt{K/I_p}$$

wherein $\omega_n$ = natural torsional spring frequency
$K$ = net torsional spring constant in inch-pounds per radian of torsional deflection
$I_p$ = polar moment of inertia The polar moment of inertia varies but slightly with variations in the sizes and positions of the flaps, inasmuch as the flaps are small and have but little weight. Under the conditions here being considered, variations in the polar moment of inertia have a negligible effect as compared with variations in the net spring constant, which latter variations are extremely important.

The net torsional spring constant during rotation is derived from a summation of all of the spring constants in the system, which may be broken down broadly as follows:

1. The positive spring constant of the elastic blade.
2. The positive spring constant of the blade and all parts carried thereby resulting from centrifugal force, including that resulting from the centrifugal force moment due to coning.
3. The several negative and positive spring constants resulting from aerodynamic forces.

When there is a negative overall aerodynamic spring constant, this decreases the net spring constant of the whole system and therefore decreases the frequency, as will be apparent from the foregoing formula. Conversely, when there is a positive overall aerodynamic spring constant, this increases the net spring constant of the whole system and therefore increases the frequency.

When only a single flap is provided which is offset from the leading edge of the blade, the aerodynamic spring constant of the said flap is negative, and this may decrease the net torsional spring constant of the system to such an extent as to give a torsional frequency so low that resonance is encountered during rotation at speeds within the normal range. If only a single flap were provided offset from the trailing edge of the blade, the spring constant of the said flap would be positive and the net spring constant of the system would be increased, thus giving a very high frequency and avoiding resonance. However, such a flap offset from the trailing edge, while having a positive spring constant, would necessarily have an initial negative pitch in order to twist the blade in its pitch increasing direction. Therefore, a trailing flap if used alone would avoid resonance but would be objectionable for the reason that it would decrease rather than augment the lifting action of the blade.

In accordance with the present invention each blade is provided with two flaps, or a pair of flaps, one flap being adjacent the leading edge with a negative spring constant, and the other being adjacent the trailing edge with a positive spring constant. When the flaps are of the same or approximately the same size and are equally or approximately equally spaced from the blade axis, their combined spring constant is zero or approximately so. Thus the flaps do not substantially affect the net spring constant of the system which remains definitely constant with a large natural frequency and without resonance at normal speeds of rotation. As already stated, the two flaps cooperate to twist the blade, but they have no net lifting effect.

Another important advantage of the construction herein shown and described is the practical elimination of the hazard of flutter, which is a self-excited torsional instability of very violent nature and usually disastrous. In the general art of aerodynamics, it has been found that there is a flutter frequency when an aerofoil has its center of gravity behind its aerodynamic center, which is at approximately 25% of the chord. The flutter frequency is a function of many variables, the principal of which are:

(1) The torsional frequency of the system.
(2) The air speed of the aerofoil.
(3) The relative distance between the center of gravity and the aerodynamic center.

In the practical sense an aircraft propeller has a flutter speed sufficiently high as to not be reached under normal conditions of operation. However, in the case of a rotary wing for a helicopter, the torsional frequency of the blades is so low as to necessitate mass balancing the blades to rise the flutter speed. When the center of gravity is exactly on the aerodynamic center, the flutter speed is infinite, but as the center of gravity is moved rearward, the flutter speed rapidly decreases.

Heretofore it has been found necessary to mass balance the blades to bring the center of gravity at least as far forward as the aerodynamic center in order to avoid flutter. The substantial amount of mass necessary for this purpose, however, was a detriment and, in itself due to its added inertia, lowered the natural frequency and the torsional resonant point of the rotor system. In the present system utilizing two flaps, the rotor has an inherently higher torsional frequency, as heretofore explained in detail. This has the related effect of increasing the flutter speed, and it therefore follows that less counterweight mass is necessary.

A further advantage of the two flaps acting in the same direction to twist the blade is that a greatly increased torsional moment is provided. If an increase in torsional moment is not required, each of the flaps can be very much smaller than would be necessary for a single flap.

The action of the azimuth member 130 in adjusting and controlling the positions of the flaps for each rotor has already been explained in part. Fig. 16 shows schematically a system for manually moving the control elements 132 and the azimuth members 130 for both rotors for controlling the flight of the aircraft. In this figure the direction of normal flight is toward the left. The control members 132, 132 are shown as carried by substantially horizontal control rods 136, 136 which are supported at their rear ends by pivoted links 138, 138. The links are so connected with the rods that the latter may move either longitudinally or angularly about the axes of the links. The forward ends of the rods 136, 136 are pivotally connected at 140, 140 with vertical links 142, 142. Also connected with the links 142, 142 at 140, 140 are substantially horizontal rods 144, 144. The pivotal connections at 140, 140 are such that the rods 136, 136 and 144, 144 can move relatively to each other about the horizontal axes of the pivots, but are prevented from relative transverse movements. The rods 144, 144 are connected at their front ends by means of a ball and socket joint at 146 with a normally vertical pilot operated stick 148. The stick 148 is supported by means of a ball and socket joint at 150 and is provided at its upper end with a handle 152. The links 142, 142 are pivotally connected with the forward ends of the legs of a bifurcated yoke 154 which is supported at 156. The support at 156 is not a ball and socket joint but is so constructed that the yoke 154 may move either about a transverse horizontal axis $a-a$ or about a longitudinal horizontal axis $b-b$, but not otherwise. Rigidly connected with the yoke 154 and extending forward and upward therefrom at an angle of approximately 45° is a pilot operated stick 158 having a handle 160.

If it be assumed that the stick 148 is stationary, it will be seen that upward or downward movement of the stick 158 about the axis a—a serves to swing the rods 136, 136 upward or downward with resultant upward or downward movement of the control elements 132, 132 and of the azimuth members 130, 130. As has already been explained, upward movement of the control elements and azimuth members serves to increase the collective pitches of the blades thus giving the rotors increased lifting power. Downward movement of the control elements and azimuth members serves to decrease the collective pitches of the blades thus giving the rotors decreased lifting power. Thus the operator, by moving the stick 158 upward or downward, can increase or decrease the lifting power of the rotors, and can cause the aircraft to move vertically upward or downward as required. It will be understood that the term "vertical" as applied to aircraft movement includes any movement having a vertical component.

As already explained, the bars 120, 120 are oscillated when the azimuth members are so moved in any direction so that their axes of rotation are inclined with respect to the axes of rotation of the shafts 20, 20. Thus the links 90 and 92 are moved oppositely and the flaps on the respective blades of each rotor are oscillated successively, those on one blade moving in their pitch increasing directions while those on the other blade are moving in their pitch decreasing directions. It will be observed that when the control elements are moved in any particular direction, the flaps on the blades which are momentarily extending in the corresponding direction are in their positions of maximum twisting moment to give the blades their maximum pitch, and the flaps on the blades which are momentarily extending in the opposite direction are in their positions of minimum twisting moment to give the blades their minimum pitch. Thus as the rotors are rotated, each blade is given its maximum pitch as it passes a position corresponding to that of the corresponding control element and is given its minimum pitch as its passes a position 180° from the first said position.

The positional timing of the flap oscillations with respect to the fuselage is determined by the direction in which the control elements 132, 132 are moved. For example, when the stick 148 is moved in the forward direction the control elements 132, 132 are moved in the rearward direction. When the control elements are so moved, each blade as it passes its forward position has its flaps in their positions of minimum pitch to give the blade its minimum pitch, and each blade as it passes its rearward position has its flaps in their positions of maximum pitch to give the blade its maximum pitch. This tends to incline the aircraft downward toward the front and causes travel or flight in the forward direction. The stick 148 can be moved in any direction thus correspondingly changing the positional timing of the oscillations and shifting the positions of maximum and minimum pitches of the blades and causing travel or flight of the aircraft in any desired horizontal direction corresponding to the direction of movement of the stick. It will be understood that the term "horizontal" as applied to the aircraft movement includes any movement having a horizontal component.

The stick 158 is movable not only upward or downward about the axis a—a, as already described, but is also movable transversely about the axis b—b. By moving the stick 158 transversely, the lifting power of one rotor can be increased and that of the other rotor decreased, thus effecting an unbalanced turning torque on the aircraft together with a slight banking. When the stick is moved toward the right the lifting power of the left rotor is increased and when the stick is moved toward the left the lifting power of the right rotor is increased. The result is a change in the direction of flight corresponding to the direction of movement of the stick.

By moving the two sticks 158 and 148 simultaneously, or alternatively, the operator can control the operation of the aircraft in any desired manner to cause it to move upward or downward and to effect flight in any desired direction and to change the direction of flight as required. The handle on one of the sticks, as for instance the handle 160 on the stick 158, may be rotatable and may be connected with the throttle control of the power plant. Thus the operator can adjust the throttle without removing his hands from the sticks, and the amount of power can be increased or decreased to meet requirements.

As thus far described, it has been assumed that the azimuth member 130 is in vertical register with the respective blades of the rotor. Actually, however, as indicated in Fig. 16, the azimuth member is out of vertical register with the blades and the respective ends of the member lead the blades by substantial angles. The changes in the effective pitches of the blades, being dependent on the aerodynamic action of the flaps, cannot be effected instantly and there is a slight lag between the actual movement of the flaps and the change in effective pitches. However, there is a substantial lag between the azimuth position at which the rotor blades assume their increased pitch and the azimuth position at which the rotor blades assume their positions of maximum pitches. The amount of lag is principally a function of the resonant properties of the flatwise beam (comprising the connected blades 26, 26) and hinge criteria as well as the torsional criteria. It is also a function of rotative speed. In a perfectly general case the lag angle may be anything between 0° and 90°, but in special circumstances could be above 90°. It is therefore necessary to adjust the lead of the ends of the azimuth member to accomplish the best compromise lead angle for all flight conditions and rotative speeds. When the ends of the azimuth member 130 are given lead angles, the links 90 and 92 are inclined within the hollow shaft 20 to compensate for the said lead angles.

With a control mechanism, such as shown in Fig. 16, the lag in the effective pitches of the blades could be compensated by correspondingly moving the stick 148. In such case, however, the stick would not be inclined in the direction of desired flight but at an angle thereto. By providing a lead angle for the ends of the azimuth member 130, this difficulty is overcome and the direction of flight will conform to the position of the stick 148.

As each rotor is rotated and as the aircraft moves in a given direction, as for instance in the forward direction, the two connected blades of each rotor tend to oscillate or flap with respect to the hub 22 about the substantially horizontal axis of the pivot pin 84. This is due to the fact that the net air speed encountered by the blade moving in the forward direction is greater than the net air speed of the blade moving in the rearward or retreating direction. On account of the greater net air speed, the forward moving blade has a greater lift than the rearward moving or retreating blade, the result being that the forward moving blade swings upward and the rearward moving or retreating blade swings downward. Although this flapping feature has been generally accepted in rotary wings as a convenient means of automatically achieving cyclic pitch as forward motion of the aircraft increases, tilting of the tip path plane relative to the drive shaft tends to introduce tremendous oscillating forces and moments in the plane of rotation as a function of such flapping. These are scientifically computed as Coriolis loads and are exactly equivalent to the well known accelerated motions in a conventional universal joint when the shafts are operating at an angularity.

In accordance with one phase of the invention this highly adverse load condition in the plane of rotation is mitigated by provision of means for practically eliminating or substantially limiting the flapping oscillation motion beyond maximum prescribed limits, this being effected by relatively adjusting the flaps carried by the blades. When a blade swings upwardly its flaps are automatically adjusted so that the net total effective pitch of the blade is reduced. When a blade swings downwardly its flaps are automatically adjusted so that the net total effective pitch of the blade is increased. The flaps provided on the blades for this purpose may be the flaps 28, 28 and 30, 30 already described, but as to this the invention is not necessarily limited. When the said flaps are provided the control mechanism for such flaps, as already described, serves to automatically move the flaps in such a manner as to attain the results described.

By reference to Fig. 10, it will be seen that as the rotor oscillates so that the left hand blade moves upward the central portion of the support moves toward the left, the lever 110 and the attached end of the member 50 remaining relatively stationary. This is equivalent to a movement of the member 50 inward or toward the right with respect to its blade, the results being that the positive pitch of the leading flap is decreased, and that the trailing flap, if then at zero pitch, is given a positive pitch. The overall twisting moment of the flaps is decreased and the effective pitch of the blade is decreased, thus reducing the tendency of the blade to move upward. It will be seen that as the right hand blade moves simultaneously downward, the central portion of the support moves toward the left, the corresponding lever 110 and the attached portion of the corresponding member 50 remaining relatively stationary. This is equivalent to a movement of the member 50 outward or toward the right with respect to its blade, the results being that the positive pitch of the leading flap is increased and that the trailing flap, if then at zero pitch, is given a negative pitch. The overall twisting moment of the flaps is increased, thus reducing the tendency of the blade to move downward. On account of the decreased effective pitch of one blade and the increased effective pitch of the other blade, the net result is that the tendency of the blades to oscillate is eliminated, or at least very substantially reduced.

It will be seen that the automatic control of the flaps to eliminate or minimize oscillation or flapping is supplemental to and entirely independent of the manual control that has been described. The described automatic increases and decreases in the pitches of the flaps are added to or subtracted from the pitches which have been established by the described manual control mechanism. The automatic control is equally effective for all directions of flight.

The connection of the control members 50, 50 to the levers 110, 110 has an important advantage with respect to the described oscillatory movements of the rotor. The levers 110, 110 enable the pivotal connections for the inner ends of the members to be located substantially vertically below the axis of rotor oscillation at 84. There is therefore little or no upward or downward movement of the inner ends of the members relatively to their respective blades as the rotor is oscillated, and the said members move relatively to their blades substantially in the directions of their own axes. This enables each member to move freely through its guides 53.

It will be particularly observed that the horizontal pivotal axis of the rotor at 84 is above the support 24. On account of the positive dihedral or coning angles of the blades their centers of gravity are approximately in a plane passing through the axis at 84 and perpendicular to the axis of rotation. This tends to further minimize the Coriolis excitations in the plane of rotation during the presence of small flapping by eliminating or minimizing any shifting of the rotor center of gravity from the point defined by the intersection of the center lines of members 84 and 20.

In order to alleviate pilot fatigue, difficulty and coordination, it has been the prior practice in the construction of helicopters to incorporate elaborate devices for insuring the rotation of the rotors at substantially constant speeds. These elaborate and expensive control devices are unnecessary with a rotor embodying the present invention, inasmuch as the rotor is self-regulating as to speed. If there is a tendency for any reason for the rotative speeds of the rotors to slightly increase, this increase in speed will increase the forces exerted on the flaps and thus increase the effective pitches of the blades. The increased pitches of the blades increases the resistance to rotation and reduces the speed to normal notwithstanding the tendency toward increased speed. Conversely, if there is a tendency for any reason for the rotative speeds of the rotors to slightly decrease, this decrease in speed will decrease the forces exerted on the flaps and thus decrease the effective pitches of the blades. The decreased pitches of the blades decreases the resistance to rotation and causes the speed to be increased to normal, notwithstanding the tendency toward decreased speed. It will be understood that the changes in pitch resulting from increased or decreased speed, occur without any movements of the flaps about their pivotal axes.

Figure 4:
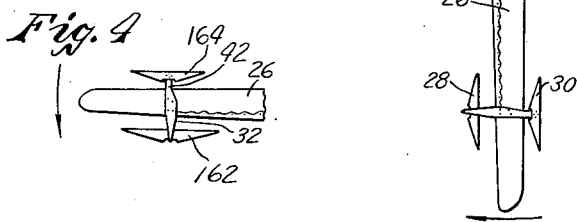
Fig. 4 is a fragmentary plan view similar to a portion of Fig. 3 but showing an alternative embodiment of the invention.

As already stated, it is ordinarily preferred to make the two flaps of each pair of the same size and to space them at equal distances from the axis of the blade, but there may be variation from the foregoing. Fig. 4 shows one such variation wherein the leading flap has a larger twisting moment than the trailing flap. As shown, the leading flap 162 is substantially larger than the trailing flap 164. The construction may be otherwise exactly as heretofore described. With this arrangement the twisting moment of the leading flap is increased and the twisting moment of the trailing flap is decreased, and there is a sacrifice of a part of the advantage incident to increasing the net positive spring constant of the blade and flaps. However, there is nevertheless a substantial advantage which is sufficient under some conditions to maintain a net positive spring constant such as to avoid resonance.

The construction shown in Fig. 4 may be highly advantageous in maintaining stability of the helicopter, inasmuch as a helicopter during hovering frequently has a highly undesirable tendency toward instability. This tendency is manifested by a pendular motion about the axis of least inertia, and if undisturbed, increases disastrously in magnitude after a few cycles. In conventional helicopters this tendency toward pendular motion has been to some extent overcome by rather bulky auxiliary stabilizing mechanisms. With a helicopter embodying the present invention as shown in Fig. 4, when there is a tendency for one rotor or the other to ascend as an incident to the pendular motion, the upward movement decreases the net force acting on the flaps to twist the blades, with the result that the effective pitches of the blades are reduced, thus counteracting the tendency of the rotor to ascend. This decrease in the net force is due to the fact that the leading flaps are larger than the trailing flaps. Conversely, when there is a tendency for one rotor or the other to descend as an incident to the pendular motion, the downward movement increases the net force acting on the flaps to twist the blades, with the result that the effective pitches of the blades are increased, thus counteracting the tendency of the rotor to descend. This action provides aerodynamic damping serving to eliminate or minimize the tendency toward pendular motion of the helicopter. Here again the changes in pitch occur without any movements of the flaps about their pivotal axes.

One of the important advantages of the invention, particularly when used in a rotary wing aircraft such as a helicopter, is that the control mechanism for the flaps is required to handle only relatively small forces and can therefore be light and simple and easily handled. In rotary wing aircraft of conventional types it has been necessary to incorporate many complicated features in order to secure proper control. This is due to the fact that the blades have been pivoted for turning about generally longitudinal axes substantially parallel with the radial center lines at the blade roots. For mounting the blades fairly large, heavy and costly ball or roller bearings have been necessary. However, complex blade deflections and deformations during flight invariably give rise to moments, both aerodynamic and dynamic about such axes. The forces resulting from such moments do not cancel out among the several blades and are to a considerable extent transmitted back to the control stick with the resultant effect known as "stick shake." With a rotor embodying the invention, the forces necessary for control are very small inasmuch as only the relatively small flaps are moved, the major portion of the forces required to change the effective pitches of the blades being aerodynamic forces resulting from the flaps themselves. The necessary amount of flap adjustment is very small and the ratio of movement between the stick and the flaps may be in the order of 100 to 1. In view of the very small movements required to adjust the blades, and in view of the very favorable ratio of movements, only a negligible effort is necessary to move the stick and there is little or no tendency for forces generated at the flaps to be transmitted back to the stick to cause "shake."

In view of the small size of the flaps, the bearings and other parts for supporting them can be small, the total weight being very much less than that of the conventional large bearings which are utilized when the entire blades are bodily rotatable. Furthermore, the large blade supporting bearings as heretofore used tend to rapidly deteriorate for the reason that they are subject to heavy loads and to rotary vibration due to rapidly changing forces transmitted from the blades. Rotary vibration at the bearings causes lubrication failure with resultant rusting and other deterioration. This difficulty is largely, if not in fact completely, overcome with the smaller lighter bearings used for supporting the relatively small flaps.

The pairs of flaps 28 and 30, together with the mechanisms on the blades for angularly moving the flaps, constitute means for twisting the blades and for thus adjusting or changing the lifting powers thereof. The particular means for changing the lifting powers of the blades as shown and described has many advantages, but as concerns certain phases of the invention it is not essential that this paritcular means be used. Reference is made more particularly to the mechanism shown in Figs. 14 and 15 which includes the azimuth member and associated parts, and to the specific pilot controlled actuating mechanism which is shown in Fig. 16. These last-mentioned mechanisms may have more general utility and it is not essential that they be used with twistable blades wherein the pitches are adjusted aerodynamically by means of flaps.

What I claim is:

1. An aircraft of the rotary blade type including in combination, a fuselage, a power driven substantially vertical shaft connected with the fuselage, a plurality of similar radially extending aerofoil blades equally spaced circumferentially and having their root portions connected with the shaft for rotation therewith and so held as to prevent rotative movements of the said root portions about axes extending longitudinally of the blades, each blade being capable of substantial twisting about its longitudinal mean axis and with respect to its nonrotatable root portion and having torsional resiliency causing it to be restored to its normal position after such twisting, a plurality of similar pairs of aerofoil flaps carried respectively by the outer portions of the blades with one flap of each pair adjacent the leading edge of its blade and with the other flap of each pair adjacent the trailing edge of the same blade, all of the said pairs of flaps being substantially equally spaced from the shaft and being angularly movable relatively to their respective blades about axes substantially parallel with the mean axes of the blades and the flaps of each pair being connected with each other for movement in opposite directions about their respective axes so that the flaps of the said pairs normally serve by reason of aerodynamic forces acting thereon during rotation to twist the respective blades progressively from the said root portions toward the said flaps and to thereby change the effective blade pitches to varying substantial extents dependent on varying relative angular positions of the flaps, relatively movable flap moving connections extending from the flaps of the said pairs to the fuselage, and a pilot controlled flap actuating mechanism on the fuselage for moving the said connections during rotation of the blades and flaps so as to angularly move the flaps of the several pairs relatively to the blades, the said flap actuating mechanism enabling the pilot to control the movement of the aircraft by reason of varying flap induced twisting of the blades and the resultant varying effective pitches thereof.

2. An aircraft of the rotary blade type including in combination, a fuselage, a power driven substantially vertical shaft connected with the fuselage, a plurality of similar radially extending aerofoil blades equally spaced circumferentially and having their root portions connected with the shaft for rotation therewith and so held as to prevent rotative movements of the said root portions about axes extending longitudinally of the blades, each blade being capable of substantial twisting about its longitudinal mean axis and with respect to its nonrotatable root portion and having torsional resiliency causing it to be restored to its normal position after such twisting, a plurality of similar pairs of aerofoil flaps carried respectively by the outer portions of the blades with the flaps of each pair respectively spaced substantially in the leading and trailing directions from the longitudinal mean axis of the corresponding blade, all of the said pairs of flaps being substantially equally spaced from the shaft and being angularly movable relatively to their respective blades about axes substantially parallel with the mean axes of the blades and the flaps of each pair being connected with each other for movement in opposite directions about their respective axes so that the flaps of the said pairs normally serve by reason of aerodynamic forces acting thereon during rotation to twist the respective blades progressively from the said root portions toward the said flaps and to thereby change the effective blade pitches to varying substantial extents dependent on varying relative angular positions of the flaps, relatively movable flap moving connections extending from the flaps of the said pairs to the fuselage, and a flap actuating mechanism on the fuselage including means for utilizing the said connections to successively and cyclically oscillate the flaps of all of the several pairs relatively to their respective blades during each rotation which mechanism is adjustable by the pilot to change the timing of the successive cyclic oscillations, the said actuating mechanism enabling the pilot to cause horizontal movement of the aircraft in any direction by reason of changes in the timing of the flap induced cyclic twisting of the blades.

3. A helicopter as set forth in claim 2, wherein the flap actuating mechanism includes means additional to the last aforesaid means for utilizing the said flap moving connections to angularly move the flaps of all of the several pairs uniformly relatively to their respective blades.

4. An aircraft of the rotary wing type including in combination, a fuselage, a power driven substantially vertical shaft connected with the fuselage, a rotor including a blade support connected with the shaft for rotation therewith and for relative pivotal movement about a substantially horizontal axis intersecting the shaft axis and also including two oppositely disposed similar radially extending aerofoil blades secured to the blade support for relative pivotal movement in unison therewith, the said blades having their root portions so held as to prevent rotative movements thereof about axes extending longitudinally of the blades and the said blades being capable of substantial twisting about their longitudinal mean axes and with respect to their nonrotatable root portions and having torsional resiliency causing them to be restored to their normal positions after twisting, two similar pairs of aerofoil flaps carried respectively by the outer portions of the two blades with one flap of each pair adjacent the leading edge of its blade and with the other flap of each pair adjacent the trailing edge of the same blade, all of the said pairs of flaps being substantially equally spaced from the shaft and being angularly movable relatively to their respective blades about axes substantially parallel with the mean axes of the blades and the flaps of each pair being connected with each other for movement in opposite directions about their respective axes so that the flaps of the said pairs normally serve by reason of aerodynamic forces acting thereon during rotation to twist the respective blades progressively from the said root portions toward the said flaps and to thereby change the effective blade pitches to varying substantial extents dependent on varying relative positions of the flaps, relatively movable flap moving connections extending from the flaps of the said pairs to the fuselage and permitting oscillation of the rotor about the said horizontal pivotal axis, and a pilot controlled flap actuating mechanism on the fuselage for utilizing the said connections during rotation of the rotor to angularly move the flaps relatively to the blades, the said flap actuating mechanism enabling the pilot to control the movement of the aircraft by reason of varying flap induced twisting of the blades and the resultant varying effective pitches thereof.

5. The combination in a helicopter, of a fuselage, a substantially vertical rotatable shaft extending upward from the fuselage, a rotor connected with the shaft and comprising two oppositely disposed substantially horizontal aerofoil blades connected with each other and with the shaft for pivotal movement in unison and in opposite directions about a substantially horizontal axis intersecting the shaft axis, each blade having torsional resiliency permitting its outer portion to be twisted with respect to the inner end thereof about a longitudinal mean axis so as to change the effective pitch and the said blades tending during rotation to oscillate in unison about the said perpendicular axis by reason of the greater lift of the blade moving in the direction of flight of the aircraft, a plurality of pairs of aerofoil flaps carried by the outer portions of the respective blades and located respectively adjacent the leading and trailing edges thereof and all of the said pairs of flaps being substantially equally spaced from the shaft and the flaps of each pair being pivotally adjustable relatively to their respective blades and the said flaps of each pair by reason of aerodynamic force acting thereon during rotation serving to twist the corresponding blade as aforesaid and to thereby change the effective pitch thereof to an extent dependent on the amount of flap adjustment, and means acting automatically during rotation of the rotor for oscillating the flaps about their respective pivotal axes during each revolution to change the pitches of the flaps on each blade as it swings relatively upward so as to cause a decrease in the pitch of the blade and to change the pitches of the flaps on each blade as it swings relatively downward so as to cause an increase in the pitch of the blade.

6. A helicopter as set forth in claim 5, including relatively movable flap moving connections extending from the flaps of the said pairs to the fuselage and permitting the said oscillation of the rotor about the said horizontal pivotal axis, and including pilot controlled flap moving mechanism on the fuselage for moving the said flap moving connections so as to angularly move the flaps of all of the said pairs relatively to their respective blades and additionally to the movements of the said flaps by the said automatically acting means.

7. The combination in a helicopter, of a fuselage, two similar substantially vertical rotatable shafts extending upward from the fuselage and spaced apart, the said shafts being connected for rotation in unison and in opposite directions, two rotors connected with the respective shafts and each comprising two oppositely disposed substantially horizontal aerofoil blades connected with each other and with the shaft for pivotal movement in unison and in opposite directions about a substantially horizontal axis intersecting the shaft axis, each blade having torsional resiliency permitting its outer portion to be twisted with respect to the inner end thereof about a longitudinal mean axis so as to change the effective pitch and the two blades of each rotor tending during rotation to oscillate in unison about the said perpendicular axis by reason of the greater lift of the blade moving in the direction of flight of the aircraft, a plurality of pairs of aerofoil flaps carried by the outer portions of the respective blades of each rotor and located respectively adjacent the leading and trailing edges thereof, all of the said pairs of flaps being substantially equally spaced from the respective shafts and the flaps of each pair being pivotally adjustable relatively to their respective blades and the said flaps of each pair by reason of aerodynamic force acting thereon during rotation serving to twist the corresponding blade as aforesaid and to thereby change the effective pitch thereof to an extent dependent on the amount of flap adjustment, and means acting automatically during rotation of the two rotors for oscillating the flaps of all of the pairs about their respective pivotal axes during each revolution to change the pitches of the flaps on each blade of each rotor as it swings relatively upward so as to cause a decrease in the pitch of the blade and to change the pitches of the flaps on each blade of each rotor as it swings relatively downward so as to cause an increase in the pitch of the blade.

8. A helicopter including in combination, a fuselage, two similar substantially vertical shafts extending upward from the fuselage and spaced apart horizontally, the said shafts being connected for rotation in unison and in opposite directions, a plurality of similar radially extending aerofoil blades on each shaft equally spaced circumferentially and having their root portions connected with the shaft for rotation therewith and so held as to prevent rotative movements of the said root portions about axes extending longitudinally of the blades, each blade being capable of substantial twisting about its longitudinal mean axis and with respect to its nonrotatable root portion and having torsional resiliency causing it to be restored to its normal position after such twisting, a plurality of similar pairs of aerofoil flaps carried respectively by the outer portions of the blades on each shaft with one flap of each pair adjacent the leading edge of its blade and with the other flap of each pair adjacent the trailing edge of the same blade, all of the said pairs of flaps being substantially equally spaced from the respective shafts and being angularly movable relatively to their respective blades about axes substantially parallel with the mean axes of the blades and the flaps of each pair being connected with each other for movement in opposite directions about their respective axes so that the flaps of the said pairs normally serve by reason of aerodynamic forces acting thereon during rotation to twist the resective blades progressively from the said root portions toward the said flaps and to thereby change the effective blade pitches to varying substantial extents dependent on varying relative angular positions of the flaps, two sets of relatively movable flap moving connections extending to the fuselage from the pairs of flaps on the blades on the respective shafts, and a pilot controlled flap actuating mechanism on the fuselage for uniformly moving the said connections of both sets during rotation of the blades and flaps so as to angularly move the flaps of the said pairs relatively to the blades, the said flap actuating mechanism enabling the pilot to control the movement of the helicopter by reason of varying flap induced twisting of all of the blades and the resultant varying effective pitches thereof.

9. An aircraft of the rotary blade type including in combination, a fuselage, a power driven substantially vertical shaft connected with the fuselage, a plurality of similar radially extending aerofoil blades equally spaced circumferentially and having their root portions connected with the shaft for rotation therewith and so held as to prevent rotative movements of the said root portions about axes extending longitudinally of the blades, each blade being capable of substantial twisting about its longitudinal mean axis and with respect to its nonrotatable root portion and having torsional resiliency causing it to be restored to its normal position after such twisting, a plurality of similar aerofoil flaps carried respectively by the outer portions of the blades and angularly movable relatively thereto about axes substantially parallel with the mean axes of the blades which flaps serve by reason of aerodynamic forces acting thereon during rotation to twist the respective blades progressively from the said root portions toward the said flaps and to thereby change the effective blade pitches to varying substantial extents dependent on varying relative angular positions of the flaps, a plurality of horizontal flap moving links extending longitudinally of the respective blades and connected at their outer ends with the corresponding flaps so that the flaps are angularly adjusted upon longitudinal movements of the links, a plurality of bell cranks rotatable with the shaft and connected therewith near the top thereof for relative movement about horizontal axes, means for operatively connecting one arm of each bell crank with the inner end of the corresponding longitudinally movable link, a plurality of vertically movable links within the hollow shaft and rotatable therewith, means for operatively conecting the upper ends of the last said links with the other arms of the respective bell cranks, and pilot controlled flap actuating mechanism on the fuselage connected with the lower ends of the vertically movable links for moving them vertically to turn the bell cranks and to thus move the horizontal links longitudinally so as to angularly adjust the flaps.

10. An aircraft of the rotary blade type as set forth in claim 9, wherein two levers are provided each of which is pivotally movable about a horizontal axis in fixed relation to the root portion of the corresponding blade, wherein two links are provided for connecting the first said arms of the respective bell cranks with the said levers, and wherein means are provided for operatively connecting the said levers with the inner ends of the respective longitudinally movable links.

11. A control mechanism for a helicopter comprising in combination, a substantially vertical hollow driving shaft, a lifting rotor with two blades connected with and driven by the said shaft, two lift adjusting means for the two blades of the rotor, two vertically extending and vertically movable actuating links respectively connected at their upper ends with the said two lift adjusting means for the rotor blades which actuating links are rotatable in unison with the said driving shaft for the rotor and are equally spaced from the axis of the said shaft, two vertically spaced similar discs located in fixed positions within the said hollow shaft each of which discs has a central bearing aperture and has two oppositely positioned eccentric apertures through which the said vertically movable actuating links extend, a member extending through and fitting the bearing apertures in the discs and vertically movable therein, means for connecting the said member for rotation in unison with the discs and the shaft, a bar pivoted between its ends to the lower end of the last said member for movement about a horizontal axis in fixed relation to the said member, the said bar being rotatable in unison with the said member and the shaft, a pivotal connection between the lower ends of the actuating links and the said bar which connections have horizontal axes and are equally spaced from the pivotal axis of the bar, an azimuth member pivotally connected with the bar for relative movement about an axis perpendicular to the said pivotal axis of the bar, the said azimuth member being rotatable in unison with the shaft and with the bar, a movable nonrotatable control element having a bearing with which the azimuth member is engaged, pilot controlled means for moving the control element vertically to thus move the azimuth member vertically so as to uniformly change the lifting powers of the two blades of the rotor, and pilot controlled means for moving the control member horizontally in any direction to angularly change the position of the axis of rotation of the azimuth member so as to cyclically change the lifting powers of the two blades of the rotor.

12. A control mechanism for a helicopter comprising in combination, two transversely spaced substantially vertical oppositely rotatable driving shafts, two multiple bladed lifting rotors respectively connected with and driven by the said shafts, two sets of lift adjusting means for the blades of the respective rotors, two similar horizontally spaced sets of vertically extending and vertically movable actuating members which are respectively rotatable with the said driving shafts with the members of each set equally spaced from the axis of the corresponding shaft, the actuating members of the said sets being respectively connected at their upper ends with the said lift adjusting means for the blades of the two rotors, two horizontally spaced rotatable azimuth members which are vertically movable independently of each other and which are also angularly movable for changing the positions of their axes of rotation, means for operatively connecting the lower ends of the vertically movable actuating members of the two said sets with the respective azimuth members, two similar horizontally spaced movable nonrotatable control elements having bearings with which the respective rotatable azimuth members are engaged, a pivotally movable pilot operated stick, means connecting the stick with the two control elements and constructed and arranged to enable the said stick to move the said elements vertically to thus move the two azimuth members vertically so as to change the lifting powers of the blades of the respective rotors, a second pilot operated stick pivotally movable about a longitudinal axis and also pivotally movable about a transverse axis, and means connecting the second said stick with the two control elements and constructed and arranged to enable the said stick upon movement about either or both of its said pivotal axes to move the said control elements horizontally in unison in any direction to angularly change the positions of the axes of rotation of the two azimuth members so as to change cyclically and to uniform extents the lifting powers of the several blades of the two rotors.

13. A control mechanism for a helicopter as set forth in claim 12, wherein the first said stick is pivotally movable longitudinally or transversely or both, wherein the means connecting the said first stick with the two control elements is constructed and arranged to serve upon longitudinal stick movement to move both control elements vertically in unison to thus move the two azimuth members vertically in unison so as to change to the same extents the lifting powers of the blades of the two rotors, and wherein the said means connecting the first said stick with the two control elements is also constructed and arranged to serve upon transverse stick movement to move the two control elements vertically to different extents to thus move the azimuth members vertically to different extents so as to change to different extents the lifting powers of the blades of the two rotors.

14. A control mechanism for a helicopter comprising in combination, two transversely spaced substantially vertical oppositely rotatable driving shafts, two multiple bladed lifting rotors respectively connected with and driven by the said shafts, two sets of lift adjusting means for the blades of the respective rotors, two similar horizontally spaced sets of vertically extending and vertically movable actuating members which are respectively rotatable with the said driving shafts with the members of each set equally spaced from the axis of the corresponding shaft, the actuating members of the said sets being respectively connected at their upper ends with the said lift adjusting means for the blades of the two rotors, two horizontally spaced rotatable azimuth members which are vertically movable independently of each other and which are also angularly movable for changing the positions of their axes of rotation, means for operatively connecting the lower ends of the vertically movable actuating members of the two said sets with the respective azimuth members, two similar transversely spaced longitudinally extending substantially horizontal control rods carrying bearings between their ends with which the respective azimuth members are engaged, each rod being supported at one end for longitudinal movement and also for angular movement in any direction, pilot controlled means connected with the opposite ends of the rods for moving them angularly upward or downward either uniformly in the same direction or differentially in opposite directions to correspondingly move the azimuth members upward or downward, the said azimuth members upon uniform upward or downward movements serving to uniformly change the lifting powers of the blades of the two rotors and the said azimuth members upon differential upward and downward movements serving to differentially change the lifting powers of the blades of the two rotors, and pilot controlled means connected with the said opposite ends of the rods for moving them uniformly either longitudinally or angularly in transverse directions or both to angularly change the positions of the axes of rotation of the azimuth members so as to change cyclically and to uniform extents the lifting powers of the several blades of the two rotors.

CHARLES H. KAMAN.

References Cited in the file of this patent

UNITED STATES PATENTS

| Number | Name | Date |
|---|---|---|
| 1,210,376 | James | Dec. 26, 1916 |
| 1,279,127 | Lake | Sept. 17, 1918 |
| 1,836,406 | Smith | Dec. 15, 1931 |
| 1,839,194 | Blondin | Jan. 5, 1932 |
| 1,917,965 | Gerhardt | July 11, 1933 |
| 1,960,141 | D'Ascanio | May 22, 1934 |
| 2,024,853 | Gaines | Dec. 17, 1935 |
| 2,025,561 | Wilford | Dec. 24, 1935 |
| 2,271,226 | Johnson | Jan. 27, 1942 |
| 2,363,550 | Reichert | Nov. 28, 1944 |
| 2,369,048 | Hays | Feb. 6, 1945 |
| 2,371,687 | Gerhardt | Mar. 20, 1945 |
| 2,420,823 | Hays | May 20, 1947 |
| 2,437,789 | Robins | Mar. 16, 1948 |
| 2,455,866 | Kaman | Dec. 7, 1948 |
| 2,511,687 | Andrews | June 13, 1950 |

FOREIGN PATENTS

| Number | Country | Date |
|---|---|---|
| 672,424 | Germany | Mar. 2, 1939 |
| 802,610 | France | Sept. 9, 1936 |
| 888,158 | France | Aug. 30, 1943 |

OTHER REFERENCES

Serial No. 254,867, Flettner (A. P. C.), published May 25, 1943.